United States Patent [19]

Stover et al.

[11] 4,298,372

[45] Nov. 3, 1981

[54] COMBUSTION AIR FLOW CONTROL FOR REGENERATORS

[75] Inventors: K. Lawrence Stover, Genoa; Alejandro G. Bueno, Toledo; James W. Miller, Rossford; Donald E. Shamp, Millbury, all of Ohio

[73] Assignee: Libbey-Owens-Ford Company, Toledo, Ohio

[21] Appl. No.: 123,559

[22] Filed: Feb. 22, 1980

[51] Int. Cl.³ ............................................. C03B 5/44
[52] U.S. Cl. ...................................... 65/136; 65/162; 65/347; 432/181
[58] Field of Search ......................... 65/162, 347, 136; 432/181

[56] References Cited
U.S. PATENT DOCUMENTS 2,010,064  8/1935  Drake ............................... 65/347 X
2,068,924  1/1937  Mulholland ....................... 65/347 X

OTHER PUBLICATIONS

Glass-Melting Tank Furnaces, by R. Günther Society of Glass Technology, Sheffield, 1958, pp. 100-106.

Primary Examiner—Arthur D. Kellogg
Attorney, Agent, or Firm—Collins, Oberlin & Darr

[57] ABSTRACT

A method of and apparatus for directing and regulating the flow of combustion air to opposite ends of the regenerators of a regenerative tank-type glass melting furnace so as to minimize localized overheating and more uniformly heat the checkerworks of the regenerators, thereby improving the operating efficiency and prolonging the useful life thereof. To accomplish these ends, a substantial portion of the combustion air supplied to the regenerators is delivered to their downstream ends while a lesser portion is supplied to their upstream ends by ducts which include valves for cycling and a damper for apportioning the amount of combustion air flowing to opposite ends of the regenerators.

8 Claims, 5 Drawing Figures

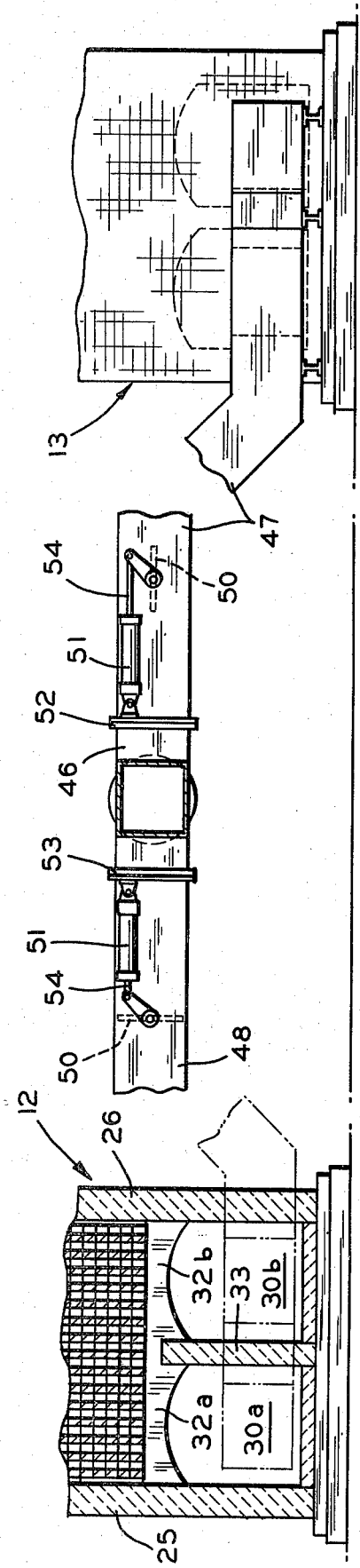
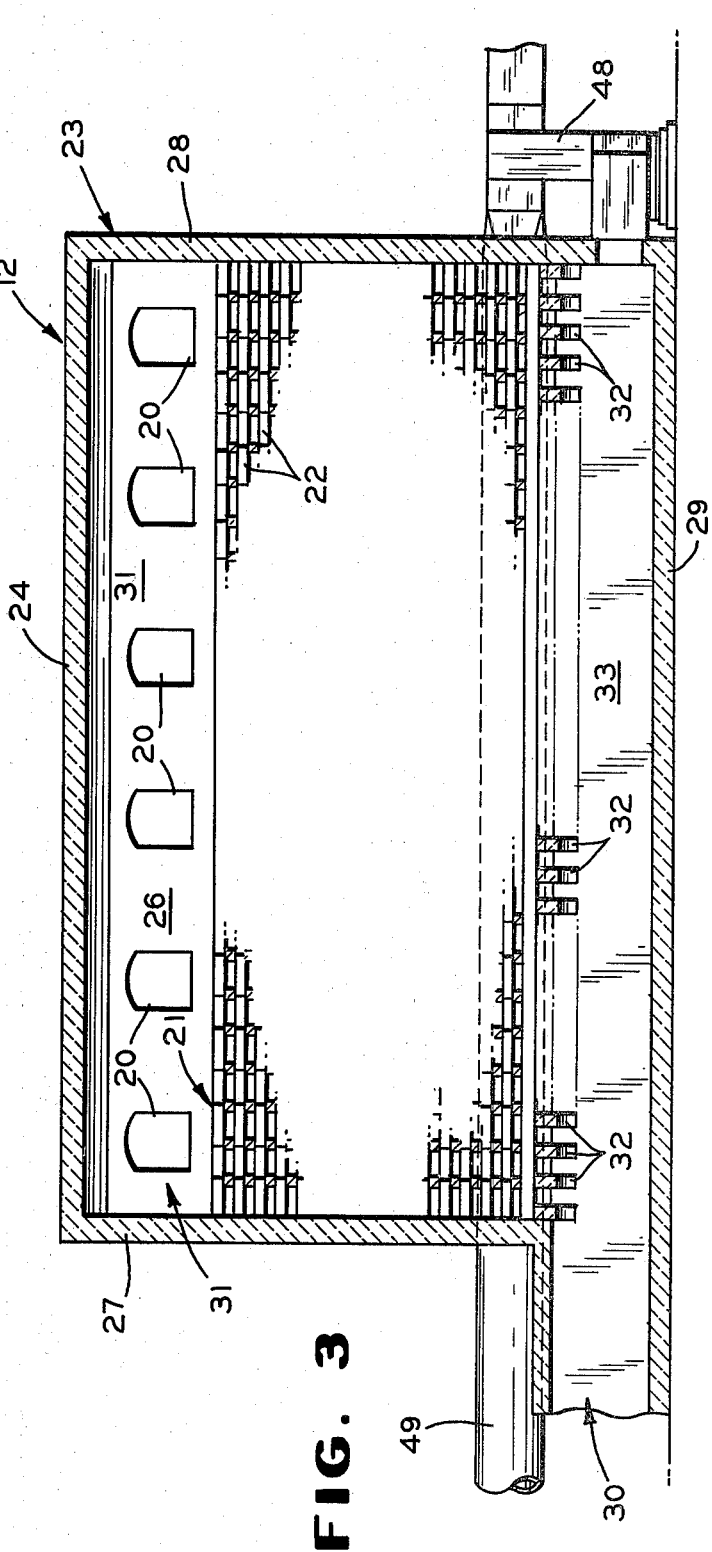
FIG. 2
FIG. 3

COMBUSTION AIR FLOW CONTROL FOR REGENERATORS

BACKGROUND OF THE INVENTION

1. Field of the Invention

The present invention relates generally to the art of glass melting, and more particularly to improvements in supplying combustion air to the regenerators of a regenerative tank-type glass melting furnace.

2. Description of the Prior Art

As is well known, flat glass is produced in a continuous tank-type melting furnace, wherein raw batch materials are continuously delivered to the charging end of the furnace, melted and refined as they move through the furnace, and then withdrawn from its delivery end as a continuous ribbon. In furnaces of this type, heat for melting the raw batch materials is provided by a series of ports arranged along each opposed longitudinal side wall, the ports leading to sources of supply of fuel and preheated combustion air. The combustion air is preheated by contact with the refractory bricks heated by the hot waste gases which have previously passed through the checkerwork of the regenerators opposite the ports being fired. The direction of firing is periodically reversed, that is, the two series of ports are alternately operated so that first one series of ports is fired and the opposite series exhausts the hot waste gases. Then at periodic intervals of about 20 to 30 minutes, the operating condition of the two series of ports is reversed; that is, the ports previously being fired serve as the exhaust ports and the ports exhausting the hot waste gases serve as firing ports.

Conventionally, the combustion air is admitted to the upstream end of the regenerators, i.e. the end adjacent the charging end of the furnace, through tunnels extending the length of and lying beneath the checkerwork structure of the regenerators. It has been found that although the tunnels extend throughout the entire length of the regenerators on each side of the furnace, because of their flow characteristics, withdrawal of hot exhaust gases is predominantly through the upstream end of the regenerators. Conversely, when colder combustion air is admitted to the regenerators, it is driven predominantly to the downstream end. Thus, the tendency to create a temperature differential is compounded and, as a result, a temperature gradient is established within the checkerwork of the regenerators whereby the checkerwork temperature at the upstream end; that is, in the vicinity of the first port, is considerably higher than at the downstream end. This is believed to not only reduce the thermal efficiency of the furnace, but also to result in premature deterioration of the regenerators due to the abnormally high localized temperatures. In other words, because of the abnormally high localized temperatures and concentration of the stored heat in localized areas, the efficiency with which the combustion air is preheated during the firing cycle is reduced.

SUMMARY OF THE INVENTION

Generally stated, the present invention contemplates a method of and apparatus for supplying combustion air to both ends of the regenerators of a glass melting furnace. More specifically, a substantial portion of the combustion air is delivered to the downstream end of the regenerators while a lesser portion is delivered to the upstream end. To this end, a fan supplying the combustion air to the regenerators is connected by a duct work system having branch ducts which extend to each end of the regenerators. A valve is installed in each branch duct connected to the downstream end of the regenerators, and these valves are alternately operated to direct the flow of combustion air to the downstream end of the regenerator on the side which the melting furnace is being fired at any particular time. A damper is installed in the branch duct connected to the upstream end of the regenerators for regulating the portion of combustion air flowing thereto. This structural arrangement, while still permitting the major portion of the hot exhaust gases to be withdrawn from the upstream end of the regenerators and thus concentrating the heat in this region, directs a major portion of the colder combustion air to the same region. Thus, instead of a cumulative effect the arrangement provides a counteracting effect whereby there is greater utilization of the heat in the regenerators as well as an equalizing of the temperature therein. Accordingly, deterioration of the regenerators at their upstream end due to the extreme temperatures is reduced.

OBJECTS AND ADVANTAGES

An object of this invention is to direct and regulate the flow of combustion air to both ends of the regenerator in a regenerative glass melting furnace.

Another object of this invention is to supply a substantial portion of the combustion air to the downstream end while supplying a lesser portion to the upstream end of the regenerator for equalizing the temperatures therein.

A further object of this invention is to provide such a combustion air supply system with valves having operating mechanisms which are integrated with the furnace's reversing means so that the valves are simultaneously cycled therewith.

Other objects and advantages of the invention will become more apparent during the course of the following description, when taken in connection with the accompanying drawings.

BRIEF DESCRIPTION OF THE DRAWINGS

In the drawings, wherein like numerals are employed to designate like parts throughout the same:

FIG. 2 is an enlarged, fragmentary, broken, end elevational view, partly in section, taken substantially along line 2—2 in FIG. 1, illustrating the branch ducts connecting the combustion air system to the downstream end of the regenerators;

FIG. 3 is an enlarged, longitudinal, elevational view of one of the regenerators, taken substantially along line 3—3 in FIG. 1;

DESCRIPTION OF THE PREFERRED EMBODIMENT

Figure 1:
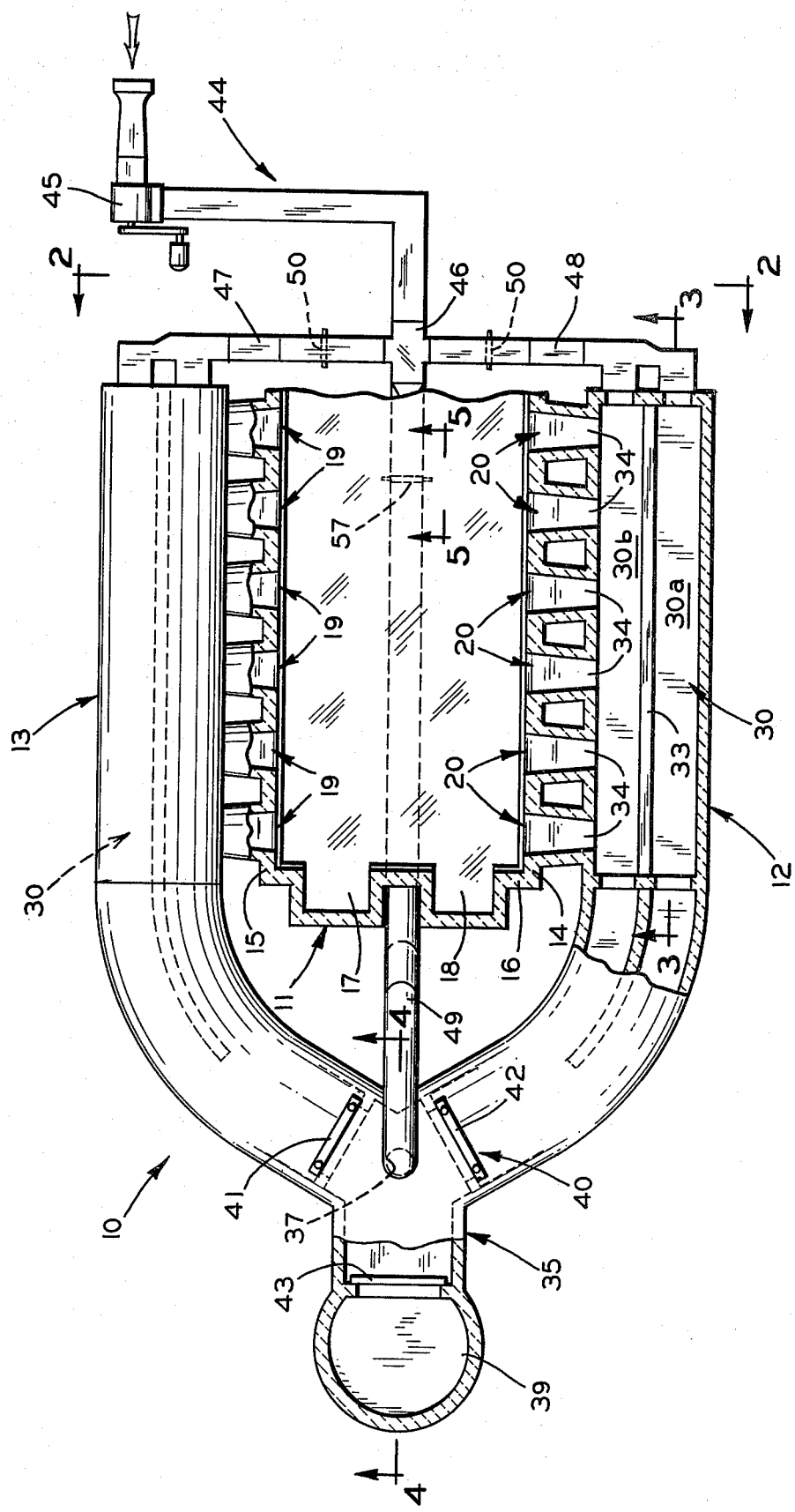
FIG. 1 is a fragmentary, diagrammatic plan view, partly in section, of the firing area of a regenerative glass melting furnace embodying the invention.

With reference to the drawings, and more particularly to FIG. 1, there is illustrated a portion of a continuous tank-type regenerative glass melting furnace, designated in its entirety by the reference numeral 10, embodying the present invention.

Generally, the glass melting furnace comprises a covered longitudinally extending tank 11 and a pair of regenerators 12 and 13, one extending along each longitudinal side of the tank 11.

The tank 11 includes opposed side walls 14 and 15, an end wall 16 and a pair of conventional feeding or doghouse areas 17 and 18. As is well known, raw glass making materials, i.e. batch and cullet or scrap glass, are introduced into the doghouse areas 17 and 18 by feeder devices (not shown) and reduced to a molten state in a melting zone, from which they flow into and through refining and cooling zones, and are thereafter removed from the opposite or exit end of the furnace in accordance with any of the well known glass forming techniques.

Heat for reducing the batch to molten glass within the melting zone is provided by suitable means such as burners (not shown) which discharge hot flames and products of combustion through two series of ports 19 and 20 opening into the melting tank 11 above the level of the molten glass flowing therethrough. As is common with furnaces of this type, the individual ports of each series 19 and 20 are arranged at spaced intervals along the sides 14 and 15, respectively, of the furnace, and the number of ports employed is predicated upon a predetermined maximum melting capacity set for the furnace 10. In this instance, six such ports are provided in each series along the side walls 14 and 15, with the ports of each series at the upstream end, that is, adjacent the doghouse areas 17 and 18, being identified as the first port. The remaining ports are similarly identified as the second through the sixth ports consecutively downstream of the doghouse areas.

Referring now to FIGS. 1 and 3, each regenerator 12 and 13 generally includes a checkerwork structure 21, composed of a plurality of cross-stacked, spaced-apart refractory bricks 22, which is contained within a unitary refractory brick housing 23. Briefly, the housing 23 includes a top or roof 24, opposed side walls 25 and 26, opposed end walls 27 and 28 and a floor 29. The end wall 27 at the upstream end of the regenerators 12 and 13 is commonly referred to as the melting end bulkhead and the end wall 28 at the downstream end of the regenerators is commonly referred to as working end bulkhead. In order to provide for the flow of combustion air and hot waste gases through the regenerators 12 and 13, each regenerator is provided with a lower plenum chamber comprising a longitudinally extending tunnel or passageway 30 and an upper longitudinally extending plenum chamber 31. To this end, each checkerwork structure 21 is supported on a plurality of transversely extending ceiling arches 32 which support it above the floor 29, and the checkerwork bricks 22 are topped off below the ports 19 and 20. For a large melting unit a single ceiling arch 32 spanning the width across the housing 23 may be unduly large, and thus two smaller arches 32a and 32b (see FIG. 2) may be provided. The inner ends of these arches 32a and 32b are supported by a vertical wall 33 extending from the floor and along the longitudinal centerline of the housing 23. These ceiling arches 32a and 32b, together with the floor 29 and a portion of each side wall 25 and 26, form the tunnel 30 which has two chambers 30a and 30b, beneath the checkerwork structure 21. It will be appreciated, however, that a single chamber tunnel would suffice if it were not necessary for structural reasons to span the width across the housing 23 by two arches instead of a single arch. The supply of combustion air to, and the exhaust of waste gases from, each series of ports 19 and 20 to the furnace are transmitted through passages 34 (see FIG. 1) opening into the upper plenum chamber 31 above the checkerwork structure 21.

Figure 4:
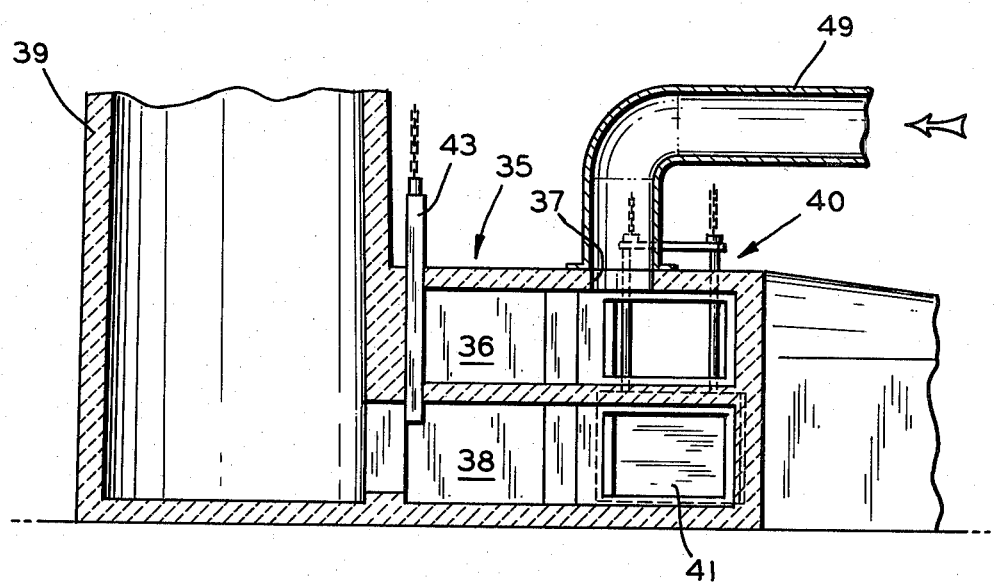
FIG. 4 is an enlarged, longitudinal, sectional view, taken substantially along line 4—4 in FIG. 1, illustrating the combustion air intake and reversing mechanism at the upstream end of the regenerators.

As best illustrated in FIGS. 1 and 4, the ends of tunnels 30 extending from the melting end bulkheads 27 merge in a Y-connection 35 having an upper combustion air passage 36 opening into a combustion air intake port 37 and a lower exhaust gas passage 38 opening into a chimney or exhaust flue 39. Accordingly, the tunnel 30 (comprised of chambers 30a and 30b) of the regenerators 12 and 13 may be alternately connected to the combustion air intake port 37 or the exhaust flue 39 as by a conventional reversing valve mechanism indicated generally by the reference numeral 40.

Briefly, the reversing valve mechanism 40 includes a pair of vertically movable valve plates 41 and 42 which are alternately raised and lowered by a mechanism (not shown) to place one tunnel in communication with the upper combustion passage 36 and the other tunnel in communication with the lower exhaust passage 38. The lower exhaust passage 38, opening into the flue 39, may be provided with a vertically movable damper plate 43 for regulating the flow of exhaust gas into the flue 39.

According to this invention and as best illustrated in FIG. 1, combustion air is directed to the opposed ends of each of the regenerators 12 and 13 by a novel duct system designated in its entirety by the reference numeral 44. In the duct system 44, combustion air is drawn from the atmosphere by a blower fan 45 and directed to a manifold 46. The manifold distributes the air by transverse branch ducts 47 and 48 connected to working end bulkheads 28 of the regenerator 12 and 13, respectively, and to a branch duct 49 by which it may be directed to an air intake port 37 provided in the reversing valve mechanism 40 connected to the melting end bulkheads 27 of the regenerators.

Referring now to FIG. 2, in accordance with the invention, each of the branch ducts 47 and 48 is provided with a butterfly valve 50 which is movable between fully open and closed positions by a conventional reversible drive mechanism, such as a power cylinder 51. Each power cylinder 51 is pivotally connected to an anchor such as flanges 52 or 53 as employed in the duct system, and their piston rods 54 are connected to crank arms 55 mounted at an end of pivot pins 56 on which the butterfly valves 50 are mounted.

Conventional control means (not shown) are provided to synchronize the operation of the power cylinders 51 with the reversing valve mechanism 40 of the furnace 10 so that the butterfly valves 50 are properly cycled with the firing of the furnace.

Figure 5:
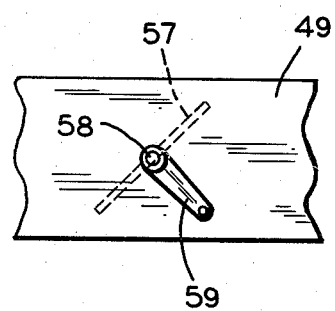
FIG. 5 is an enlarged longitudinal view taken substantially along line 5—5 in FIG. 1, illustrating the regulating means for the combustion air.

Also, in accordance with the invention and as illustrated in FIG. 5, the branch duct 49 is provided with an adjustable butterfly damper 57 whose position may be set to apportion the combustion air flowing through the branch ducts 47 or 48 connected to the working end bulkheads 28 of the regenerators 12 and 13 and the duct 49 connected to the reversing valve 40 which is the melting end bulkheads 27 of the regenerators. The damper 57 is mounted on a pivot pin 58, and its position may be set either manually by a handle 59 mounted on an end of the pivot pin 58 as shown, or by a conventional power device (not shown).

This novel system of supplying combustion air to the regenerators 12 and 13 permits apportionment between the upstream and downstream ends whereby a greater portion of the cooler combustion air is directed to the normally hotter areas of the checkers and a lesser portion is directed to the cooler areas thereof. This tends to equalize the refractory temperatures in any given strata throughout the length of the checkers. It has been found, for example, that when about 75% of the cooler combustion air is delivered to the downstream end and about 25% is delivered to the upstream end of the regenerators of a conventional six port furnace, the variation in temperatures throughout the length of the checkerworks 21 is considerably less than when all of the air is supplied at one end. More specifically, by supplying combustion air to the regenerators 21 in this novel manner, the temperatures in the lower region of the checkerworks of ports one through four are decreased while the temperature of the lower region of the checkerwork at the sixth port is raised. Accordingly, the temperatures of the checkerworks 21 are more uniformly controlled throughout the length of the regenerators, thus improving the operating efficiency of the furnace and extending the useful lives of the regenerators.

It is to be understood that the form of the invention herewith shown and described is to be taken as an illustrative embodiment only of the same, and that various changes in the shape, size and arrangement of the parts may be resorted to without departing from the spirit of the invention.

We claim:

1. In a method of supplying combustion air to the elongated regenerators spaced along each side of a regenerative tank-type glass melting furnace for improving their operating efficiency, the tank having a charging end to which batch materials are supplied and a delivery end from which molten glass is withdrawn, the regenerators being in communication with a plurality of ports spaced along the furnace and of the type including elongated checker brick structures having plenum chambers spaced above and below and extending throughout the length of the checker brick structures and with an upstream end toward the charging end of said tank and a downstream end toward the delivery end thereof, wherein incoming combustion air is admitted to the lower plenum chamber and rises through the checker brick structure to the upper plenum chamber during the firing cycle of the furnace, the improvement comprising the steps of:
   a. simultaneously supplying combustion air to both ends of the lower plenum chamber of the regenerator supplying combustion air to the furnace during the firing cycle;
   b. admitting a substantial portion of the combustion air into the downstream end of the lower plenum chamber of the regenerator; and
   c. admitting a lesser portion of the combustion air into the upstream end of the lower plenum chamber of said regenerator whereby the opposed flow of combustion air tends to minimize localized overheating and equalize the operating temperatures of said regenerator throughout its length.

2. A method of supplying combustion air to the regenerators spaced on each side of a regenerative glass melting furnace as claimed in claim 1, wherein the portion of said combustion air admitted to the downstream end of said regenerators is about 75% and the portion of combustion air supplied to the upstream end of said regenerator is about 25%.

3. In a reversing regenerative glass melting furnace of the type comprising a tank wherein batch materials are supplied at a charging end and molten glass is withdrawn at a delivery end, and including a melting zone having a plurality of ports spaced along each of two opposite sides thereof, each said plurality of spaced ports being connected to an elongated regenerator extending along the side of said furnace with an upstream end toward the charging end of said tank and a downstream end toward the delivery end thereof, said regenerator being alternately placed in communication with a source of combustion air during its firing cycle and an exhaust flue during its exhaust cycle, the improvement comprising:
   a. combustion air inlet means at each said end of said regenerator;
   b. means for supplying a substantial portion of the combustion air through said inlet means to the downstream end of the regenerator during its firing cycle; and
   c. means for supplying a lesser portion of the combustion air through said inlet means to the upstream end of said regenerator during the firing cycle whereby the opposed flow of combustion air tends to minimize localized overheating and equalize temperatures throughout the length of said regenerator.

4. A reversing regenerative glass melting furnace as claimed in claim 3, wherein said means for supplying a substantial portion of the combustion air to the regenerator comprises:
   a. a manifold connected to said source of combustion air;
   b. a duct connected between said manifold and the downstream end of each said regenerator; and
   c. valve means mounted in each said duct and alternately cyclable between open and closed positions.

5. A reversing regenerative glass melting furnace as claimed in claim 4, wherein said means for supplying a lesser portion of the combustion air to the upstream end of the regenerators comprises:
   a. a reversing valve having a combustion air intake;
   b. a connecting duct connected between said manifold and said combustion air intake; and
   c. an adjustable damper mounted in said connecting duct for apportioning the amount of combustion air flowing to said air intake of said reversing valve and said duct with said valve means in the open position.

6. In a reversing regenerative glass melting furnace of the type including an elongated tank with a batch charging area at its upstream end and molten glass delivery means at its downstream end, and having a melting zone with a plurality of ports spaced along each side of the melting zone, a regenerator extending along each side of said tank in communication with the corresponding plurality of ports, each said regenerator including a checker brick structure with a plenum chamber therebelow and extending throughout the length of the regenerator, and a duct system connecting each of said regenerators to a source of combustion air, the improvement comprising:
 a. means in said duct system selectively connecting the downstream end of each said plenum chamber to said source of combustion air;
 b. means in said duct system connecting the upstream end of each said plenum chamber to said source of combustion air simultaneously with the connection of its downstream end therewith;
 c. means in said duct system for selectively directing combustion air from said source to one or the other of said plenum chambers; and
 d. means in said duct system for apportioning the supply of combustion air between the upstream and downstream ends of said one or the other plenum chamber whereby the opposed flow of combustion air within said plenum chambers tends to minimize localized overheating and equalize temperatures throughout the length of said regenerators.

7. A reversing regenerative glass melting furnace as claimed in claim 6, wherein said means for directing combustion air to the downstream end of each plenum chamber comprises ducts connected between said source of combustion air and the downstream end of each plenum chamber, and said selective connecting means comprises butterfly valves mounted in said ducts and being alternately movable between open and closed positions.

8. A reversing regenerative glass melting furnace as claimed in claim 6, wherein said means for supplying combustion air to the upstream ends of the plenum chambers comprises a connecting duct alternately connecting said source of combustion air to the upstream end of each plenum chamber and said means for apportioning the supply of combustion air thereto comprises a butterfly damper mounted in said connecting duct and being selectively positionable therein.

* * * * *

Notice of Adverse Decision in Interference

In Interference No. 101,640, involving Patent No. 4,298,372, K. L. Stover, A. G. Bueno, J. W. Miller and D. E. Shamp, COMBUSTION AIR FLOW CONTROL FOR REGENERATORS, final judgment adverse to the patentees was rendered Aug. 9, 1988, as to claims 1 - 8.

[*Official Gazette February 14, 1989.*]